United States Patent
Li et al.

(10) Patent No.: US 11,965,692 B2
(45) Date of Patent: Apr. 23, 2024

(54) HUMAN-MACHINE INTERACTION METHOD FOR STORAGE DEVICE INSIDE REFRIGERATOR, AND REFRIGERATOR

(71) Applicants: QINGDAO HAIER REFRIGERATOR CO., LTD., Shandong (CN); HAIER SMART HOME CO., LTD., Shandong (CN)

(72) Inventors: Tao Li, Qingdao (CN); Jianguo Hou, Qingdao (CN); Xiang Fei Su, Qingdao (CN)

(73) Assignees: QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 0 days.

(21) Appl. No.: 17/788,081

(22) PCT Filed: Dec. 7, 2020

(86) PCT No.: PCT/CN2020/134243
§ 371 (c)(1),
(2) Date: Jun. 22, 2022

(87) PCT Pub. No.: WO2021/129363
PCT Pub. Date: Jul. 1, 2021

(65) Prior Publication Data
US 2023/0045006 A1  Feb. 9, 2023

(30) Foreign Application Priority Data

Dec. 26, 2019 (CN) .......................... 201911370133.7

(51) Int. Cl.
*F25D 29/00* (2006.01)
*G06F 3/0362* (2013.01)
(Continued)

(52) U.S. Cl.
CPC ......... *F25D 29/005* (2013.01); *G06F 3/0362* (2013.01); *G06F 3/0482* (2013.01);
(Continued)

(58) Field of Classification Search
CPC ................. F25D 29/005; F25D 25/025; F25D 2400/361; G06F 3/0362; G06F 3/0482; G06F 3/04847; G06F 3/0488
See application file for complete search history.

(56) References Cited

U.S. PATENT DOCUMENTS

2014/0139088 A1   5/2014  Seeley
2017/0242573 A1   8/2017  Goss et al.
(Continued)

FOREIGN PATENT DOCUMENTS

CN   103575033 A   2/2014
CN   103970429 A   8/2014
(Continued)

OTHER PUBLICATIONS

International Search Report and Written Opinion for PCT/CN2020/134243 (ISA/CN) dated Feb. 26, 2021 (10 pages).
(Continued)

*Primary Examiner* — Hang Lin
(74) *Attorney, Agent, or Firm* — ALSTON & BIRD LLP

(57) ABSTRACT

A human-machine interaction method for a storage device inside a refrigerator, and a refrigerator are provided. The storage device is arranged in a storage compartment of the refrigerator, and the storage device is provided with an operation panel. An operation surface of the operation panel is provided with a knob module having a display screen, and a touch-sensitive key module. The human-machine interaction method includes: acquiring a startup trigger signal of the operation panel; acquiring an operation instruction received by the knob module and/or the touch-sensitive key
(Continued)

module; and making a response to the operation instruction according to a preset interaction solution, and driving the display screen to display a corresponding interface. A user can adjust the functions of the refrigerator through the knob module and the touch-sensitive key module simply and conveniently.

11 Claims, 7 Drawing Sheets

(51) Int. Cl.
G06F 3/0482 (2013.01)
G06F 3/04847 (2022.01)
G06F 3/0488 (2022.01)
F25D 25/02 (2006.01)

(52) U.S. Cl.
CPC ........ *G06F 3/04847* (2013.01); *G06F 3/0488* (2013.01); *F25D 25/025* (2013.01); *F25D 2400/361* (2013.01)

(56) References Cited

U.S. PATENT DOCUMENTS

2019/0178570 A1* 6/2019 Remmel ................. F25D 23/12
2019/0353421 A1 11/2019 Junge et al.
2020/0004376 A1* 1/2020 Knoppert .............. G06F 3/0418

FOREIGN PATENT DOCUMENTS

| CN | 104344655 A | 2/2015 |
|---|---|---|
| CN | 104866005 A | 8/2015 |
| CN | 204856283 U | 12/2015 |
| CN | 106871536 A | 6/2017 |
| CN | 108845595 A | 11/2018 |
| CN | 108934771 A | 12/2018 |
| CN | 208382667 U | 1/2019 |
| CN | 109388157 A | 2/2019 |
| CN | 208567250 U | 3/2019 |
| CN | 109751831 A | 5/2019 |
| CN | 109846376 A | 6/2019 |
| CN | 109991870 A | 7/2019 |
| CN | 110246719 A | 9/2019 |
| DE | 10-2016216126 A1 | 3/2018 |
| EP | 2787313 A2 | 10/2014 |
| EP | 2787313 A3 | 4/2015 |
| EP | 2690385 A2 | 12/2016 |
| KR | 2010-0025711 A | 3/2010 |
| WO | WO 2016/026741 A1 | 2/2016 |

OTHER PUBLICATIONS

1$^{st}$ Office Action for China Application No. 2019113701337 dated Oct. 20, 2021 (6 pages).
2$^{nd}$ Office Action for China Application No. 2019113701337 dated Feb. 28, 2022 (13 pages).
*Introduction to Digital Media Technology*, www.buptpress.com, Aug. 1, 2015 [retrieved from Internet Feb. 18, 2022] (2 pages).
European Search Report for EP Patent Application No. 20906648.9 dated Nov. 22, 2022 (4 pages).
1$^{st}$ Office Action for EP Patent Application No. 20906648.9 dated Dec. 2, 2022 (5 pages).
Decision of Rejection for China Patent Application No. 201911370133.7 dated May 27, 2022 (4 pages).
Notice of Reexamination Request for China Patent Application No. 201911370133.7 dated May 9, 2022 (1 page).
2$^{nd}$ Examination Report for Australia Patent Application No. 2020410735 dated Aug. 31, 2023 (3 pages).
Decision to Grant European Patent Application No. 20906648.9 dated Sep. 7, 2023 (3 pages).
1$^{st}$ Examination Report for Australia Patent Application No. 2020410735 dated May 12, 2023 (4 pages).
Notice of Intent to Grant European Patent Application No. 20906648.9 dated May 9, 2023 (29 pages).

* cited by examiner

HUMAN-MACHINE INTERACTION METHOD FOR STORAGE DEVICE INSIDE REFRIGERATOR, AND REFRIGERATOR

CROSS-REFERENCE TO RELATED APPLICATIONS

The present application is a national phase entry of International Application No. PCT/CN2020/134243, filed Dec. 7, 2020, which claims priority to Chinese Patent Application No. 201911370133.7, filed on Dec. 26, 2019, the entire contents of which are each incorporated herein by reference in their entirety.

FIELD OF THE INVENTION

The present invention relates to the field of intelligent household appliances, and in particular to a human-machine interaction method for a storage device inside a refrigerator, and a refrigerator.

BACKGROUND OF THE INVENTION

At present, a main method for adjusting the functions of a refrigerator is achieved by keys on a display board arranged outside the refrigerator. This method for adjusting the refrigerator by a user is monotonous, and a certain specific area inside the refrigerator cannot be controlled alone. When the user adjusts the functions of the refrigerator, the refrigerator generally needs to be closed for adjustment. The adjustment process is cumbersome, and the user experience and visual experience are poor.

BRIEF DESCRIPTION OF THE INVENTION

One purpose of the present invention is to provide a simple human-machine interaction method for a storage device inside a refrigerator.

A further purpose of the present invention is to improve the diversity and richness of human-machine interaction.

Particularly, the present invention provides a human-machine interaction method for a storage device inside a refrigerator. The storage device is arranged in a storage compartment of the refrigerator, and the storage device is provided with an operation panel. An operation surface of the operation panel is provided with a knob module having a display screen, and a touch-sensitive key module. The human-machine interaction method includes: acquiring a startup trigger signal of the operation panel; acquiring an operation instruction received by the knob module and/or the touch-sensitive key module; and making a response to the operation instruction according to a preset interaction solution, and driving the display screen to display a corresponding interface.

Optionally, the response set in the interaction solution includes: switching display interfaces of multiple stages of menus and/or switching and selecting items in each stage of menu.

Optionally, the display screen is arranged in the center of the knob module. The knob module further includes: an annular rotary table, which is arranged at an outer circumferential side of the display screen and is configured to be operated to rotate. The step of acquiring an operation instruction received by the knob module includes: acquiring a rotation operation instruction corresponding to a rotation state of the annular rotary table and output by the annular rotary table; and the interaction solution includes: switching items in a current menu according to the rotation operation instruction.

Optionally, the display screen is a touch-control screen. The step of acquiring an operation instruction received by the knob module includes: acquiring a touch-control operation instruction received by the display screen; and the interaction solution includes: selecting an item in a menu according to the touch-control operation instruction.

Optionally, the touch-sensitive key module includes a plurality of touch-control keys. The step of acquiring an operation instruction received by the touch-sensitive key module includes: acquiring touch instructions received by the plurality of touch-control keys; and in the interaction solution, a corresponding response action is pre-configured for the touch instruction of each touch-control key.

Optionally, the menu includes: a first-stage menu; and items set in the first-stage menu include a temperature area function that can be achieved by the storage device.

Optionally, the menu further includes: a second-stage menu; and items set in the second-stage menu include a refrigeration function that can be provided by a selected temperature area.

Optionally, the menu further includes: a third-stage menu; and items set in the third-stage menu include running parameters of the selected refrigeration function.

Optionally, before the step of acquiring a startup trigger signal of the operation panel, the human-machine interaction method further includes: sending a function query request to a controller of the refrigerator; and configuring the interaction solution according to a feedback of the controller in response to the function query request.

According to another aspect of the present invention, a refrigerator is further provided, which includes: a cabinet, in which a storage compartment is defined; a storage device, arranged in the storage compartment of the refrigerator, wherein the storage device is provided with an operation panel, and an operation surface of the operation panel is provided with a knob module having a display screen, and a touch-sensitive key module; and a controller, which is connected with the operation panel and includes a memory and a processor, wherein the memory stores a computer program, when executed by the processor, the computer program is configured to implement the above human-machine interaction method.

According to the human-machine interaction method for the storage device inside the refrigerator, and the refrigerator of the present invention, the storage device is arranged in the storage compartment of the refrigerator, and the storage device is provided with the operation panel. The operation surface of the operation panel is provided with a knob module having a display screen, and a touch-sensitive key module. By means of acquiring a startup trigger signal of the operation panel, an operation instruction received by the knob module and/or the touch-sensitive key module is acquired; and a response is made to the operation instruction according to the preset interaction solution, and the display screen is driven to display a corresponding interface. Compared with the prior art in the fields of intelligent house, intelligent home, intelligent household appliances, intelligent refrigerators, and the like, the solution of the present invention achieves that a user adjusts the functions of the refrigerator through the knob module and the touch-sensitive key module. The human-machine interaction mode is simple and convenient, and the intelligence level is increased.

Further, according to the human-machine interaction method for the storage device inside the refrigerator, and the refrigerator of the present invention, a rotation operation instruction corresponding to the rotation state of the annular rotary table and output by the annular rotary table may be acquired, and the interaction solution includes: switching items in a current menu according to the rotation operation instruction. A touch-control operation instruction received by the display screen may be acquired, and the interaction solution includes: selecting an item in a menu according to the touch-control operation instruction. Spinning a button can set refrigeration parameters of the storage device inside the refrigerator, and can also display its state, thus improving the richness of human-machine interaction.

The above and other objectives, advantages, and features of the present invention will be better understood by those skilled in the art according to the following detailed description of specific embodiments of the present invention in conjunction with the accompanying drawings.

BRIEF DESCRIPTION OF THE DRAWINGS

In the following part, some specific embodiments of the present invention will be described in detail in an exemplary rather than limited manner with reference to the accompanying drawings. The same reference numerals in the accompanying drawings indicate the same or similar components or parts. Those skilled in the art should understand that these accompanying drawings are not necessarily drawn to scale. In the drawings.

DETAILED DESCRIPTION

Figure 1:
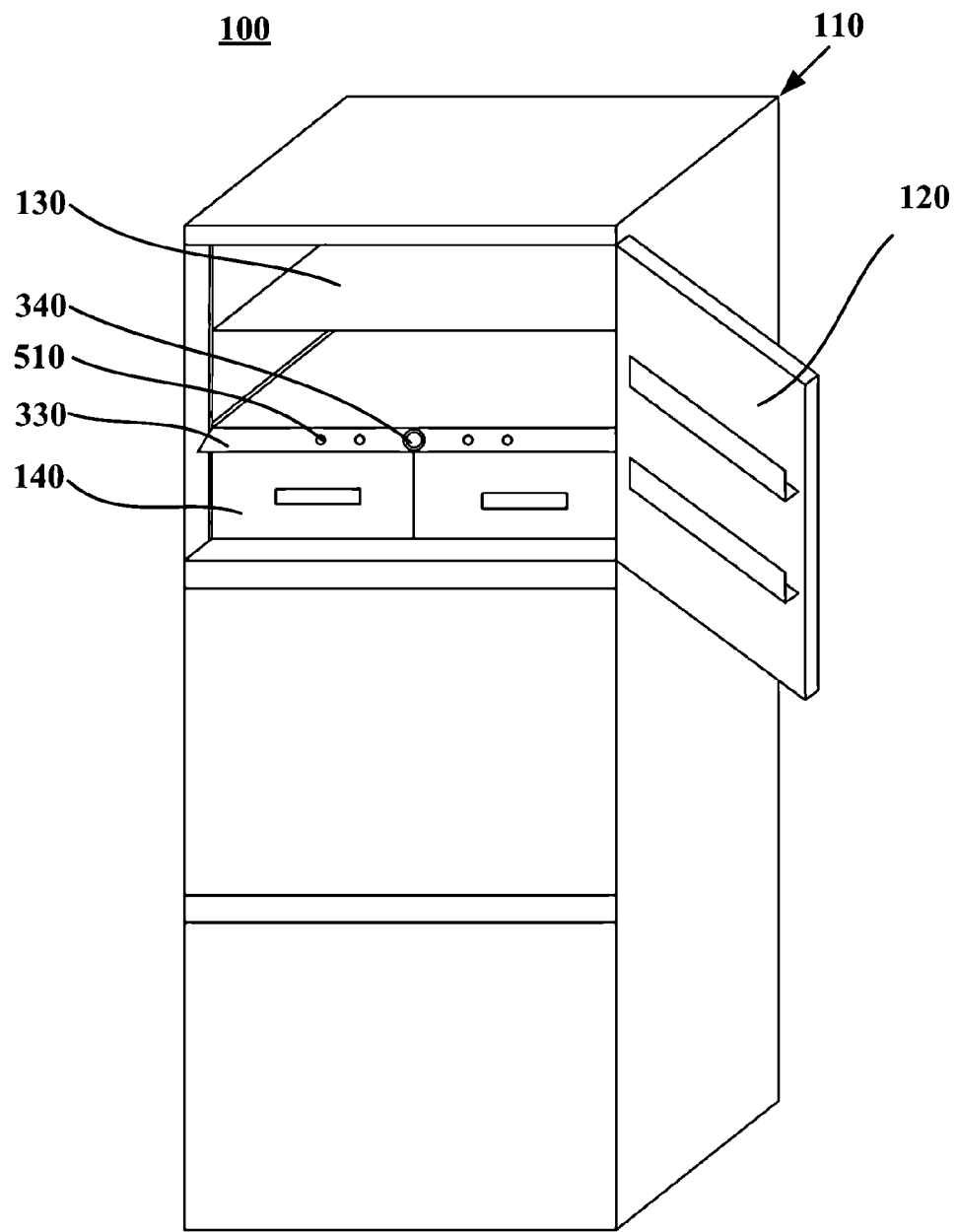
FIG. 1 is a schematic diagram of a refrigerator according to an embodiment of the present invention.
Figure 2:
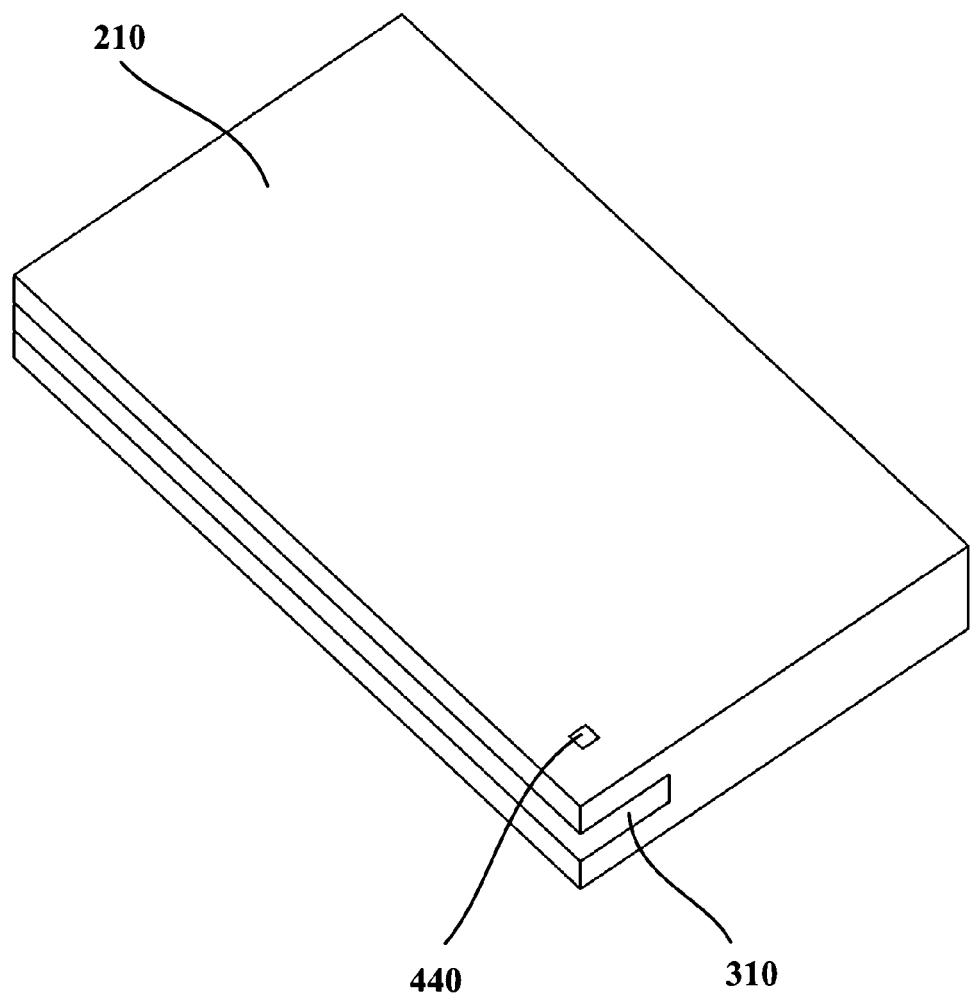
FIG. 2 is a schematic structural diagram of a base plate in a refrigerator according to an embodiment of the present invention.
Figure 3:
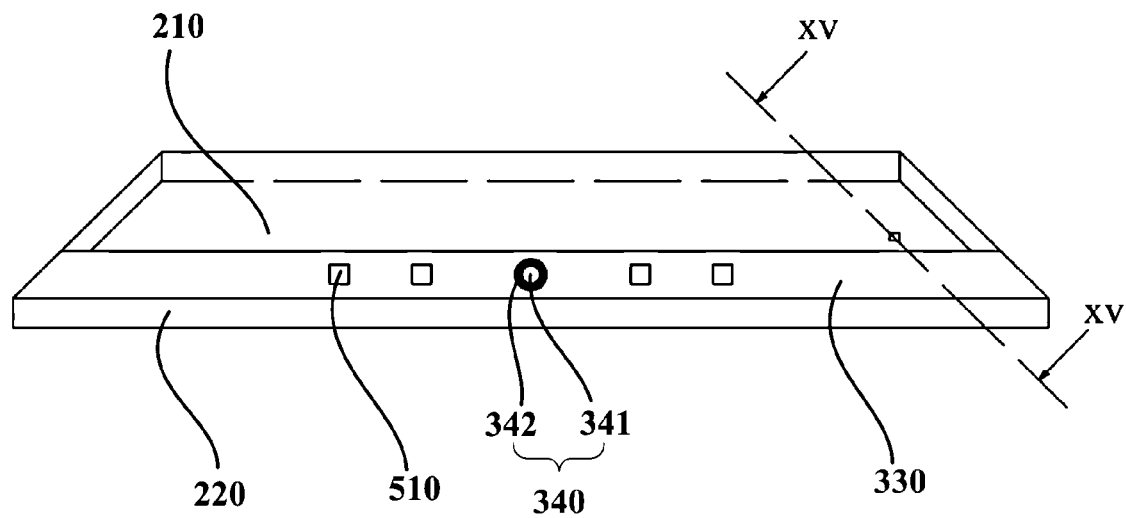
FIG. 3 is a schematic structural diagram of a base plate and an operation panel in a refrigerator according to an embodiment of the present invention.
Figure 4:
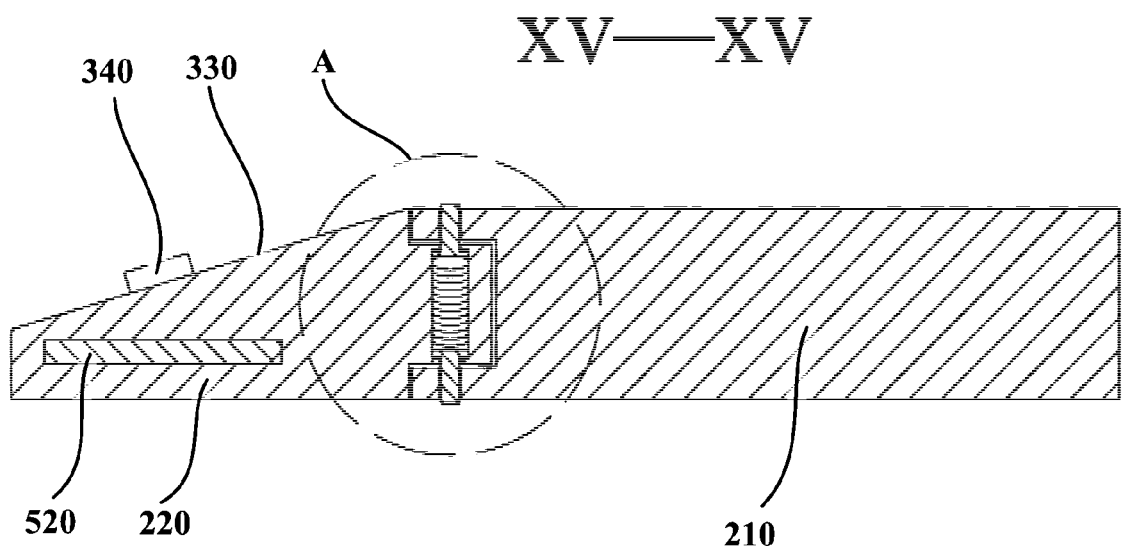
FIG. 4 is a section view along xv-xv in FIG. 3.
Figure 5:
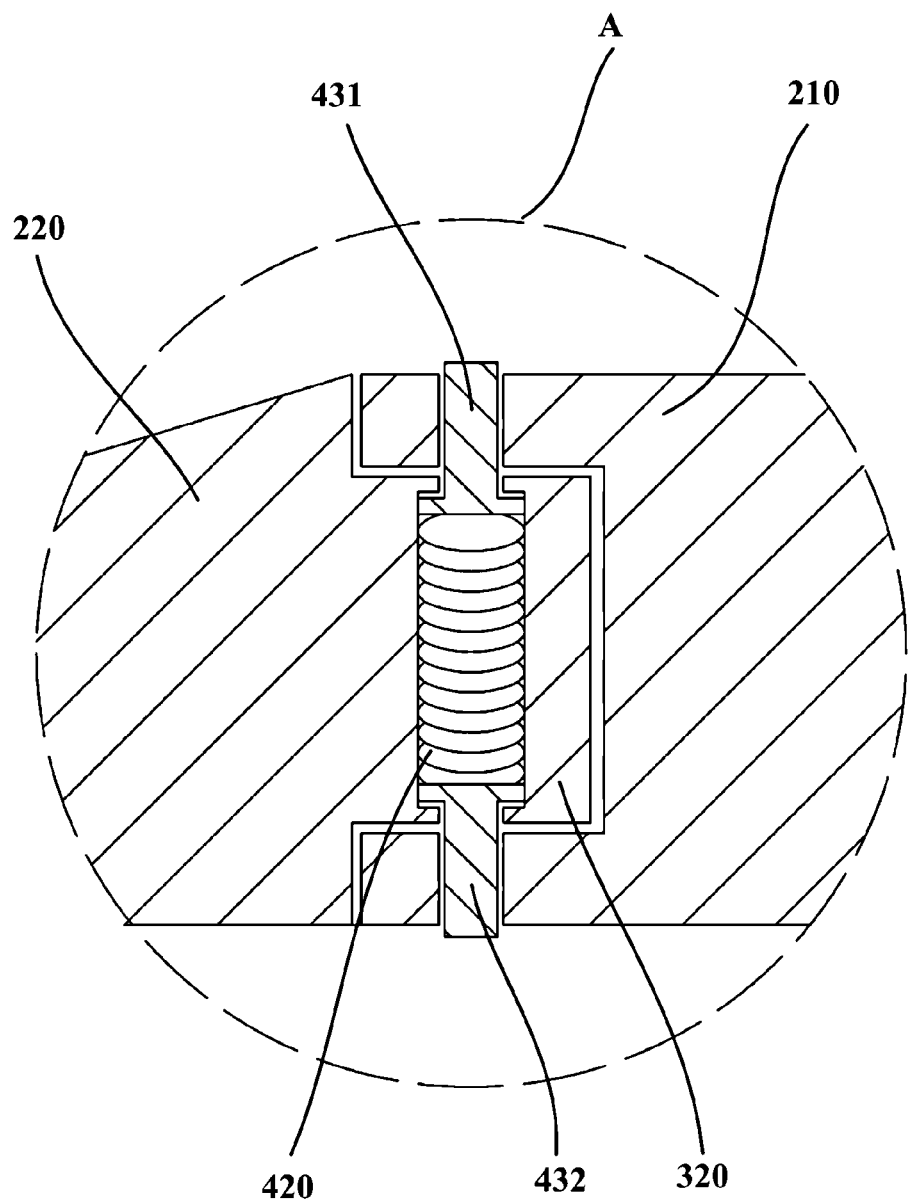
FIG. 5 is a partially enlarged view of part A in FIG. 4.
Figure 6:
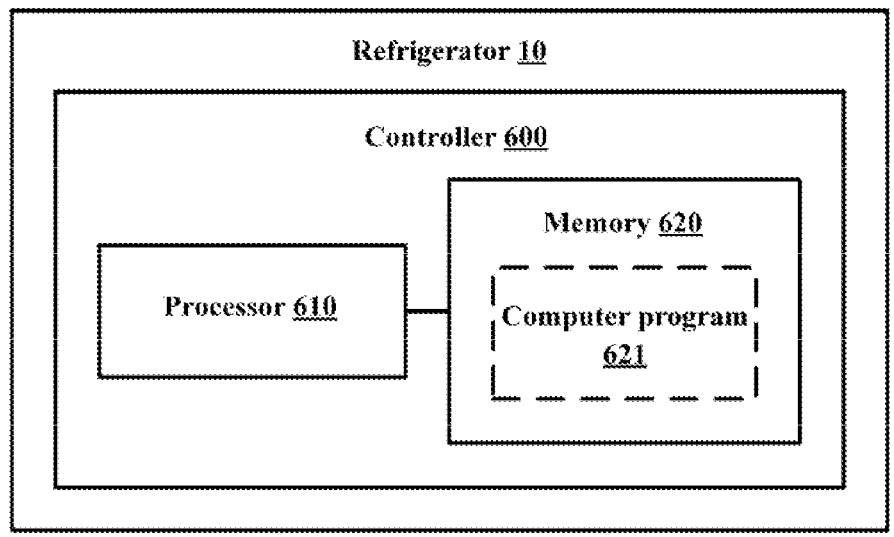
FIG. 6 is a schematic block diagram of a refrigerator according to an embodiment of the present invention.

FIG. 1 is a schematic diagram of a refrigerator 1000 according to an embodiment of the present invention. FIG. 2 is a schematic structural diagram of a base plate 210 in a refrigerator 1000 according to an embodiment of the present invention. FIG. 3 is a schematic structural diagram of a base plate 210 and an operation panel 220 in a refrigerator 1000 according to an embodiment of the present invention. FIG. 4 is a section view along xv-xv in FIG. 3. FIG. 5 is a partially enlarged view of part A in FIG. 4. FIG. 6 is a schematic block diagram of a refrigerator 1000 according to an embodiment of the present invention. As shown in FIG. 1 to FIG. 6, the refrigerator 100 of this embodiment may generally include: a cabinet 110, a storage device, and a controller 600.

A storage compartment is defined in the cabinet 110. Specifically, at least one storage compartment with an opening in a front side is defined in the cabinet 110. Generally, there are a plurality of storage compartments, such as a refrigerating chamber, a freezing chamber, and a variable temperature chamber. The specific number and functions of the storage compartments can be configured according to prior requirements. In addition, the refrigerator 100 may further include: a door body 120 arranged at the front side of the cabinet 110 and configured to open and close the storage compartment. For example, the door body 120 can be arranged at one side of a front part of the cabinet 110 in a hinged manner, and opens and closes the storage compartment in a pivoted manner. The number of the door body 120 can be matched with the number of the storage compartment, so that the storage compartment can be opened separately one by one. For example, a refrigerating chamber door body, a freezing chamber door body, and a variable temperature chamber door body may be respectively set for the refrigerating chamber, the freezing chamber, and the variable temperature chamber. A refrigeration system supplies cold energy to the storage compartment to achieve storage environments for refrigerating, freezing, and variable temperature.

Referring to FIG. 1, in some embodiments, the inside of the storage compartment is defined into a plurality of independent spaces by a shelf plate 130, a drawer 140, and the like. Independent of the refrigerating chamber, this part is provided with a specific air duct and ventilation door for separate refrigeration, thus controlling changes in dryness, humidity, and temperature of this part. The refrigerating chamber includes a plurality of storage spaces having openings in front sides and defined by a plurality of shelf plates 130, and independent storage spaces defined by a plurality of drawers 140.

The storage device of this embodiment is arranged in the storage compartment of the refrigerator 100, and the storage device is provided with an operation panel 220. An operation surface 330 of the operation panel 220 is provided with a knob module 340 having a display screen 341, and a touch-sensitive key module. In one specific embodiment, the storage device includes a base plate 210 and the operation panel 220. The base plate 210 is mounted inside the storage compartment of the refrigerator 100. A side part of the base plate 210 close to the door body 120 of the refrigerator 100 has a mounting slot 310. The operation panel 220 is provided with a bulge part 320 which is clamped in the mounting slot 310 in the base plate 210 to connect the base plate 210. The operation surface 330 is formed on an upper surface of the operation panel 220. The knob module 340, which is configured to operate refrigeration parameters inside the storage device, is arranged in the middle of the operation surface 330.

According to the refrigerator in the prior art, internal refrigeration parameters and parameters such as the dryness, the humidity, and the temperature are generally displayed and operated by a display panel disposed on the door body 120 and carrying a light emitting diode (LED) lamp. However, when the door body 120 is opened, some setting and display functions of a control panel will be limited. At the same time, operation such as separate temperature adjustment cannot be performed on the independent drawers 140, so that inconvenience is caused in actual use. In the embodiment of the present application, the knob module 340 arranged on the operation panel 330 can be used to control the independent drawers 140 inside the refrigerator 100, so that the defect that for some refrigerators, the inside thereof cannot be controlled when the door body 120 is opened is solved, and it is convenient for a user to perform the operation such as temperature adjustment on the independent drawers 140.

Referring to FIG. 3, in order to further enrich the experience of human-machine interaction, the knob module 340 in this embodiment is provided with the display screen 341, and further includes an annular rotary table 342. The display screen 341 is arranged in the center of the knob module 340. The annular rotary table 342 is arranged at an outer circumferential side of the display screen 341, and is configured to be operated to rotate. Specifically, the display screen 341 may be circular, and is configured to display a current operation state and the refrigeration parameters in the storage device. In one preferred embodiment, the display screen 341 may be a touch screen, and may receive a touch operation instruction.

The touch-sensitive key module may include a plurality of touch-control keys 510. Specifically, the touch-control keys 510 may be provided at two sides of the knob module 340. The touch-control keys 510 may cooperate with the knob module 340 to adjust switches, function selection, and the like inside the storage device. The number of the touch-control keys 510 is at least two. There are four touch-control keys 510 in the embodiment of the present application, which are symmetrically distributed at the two sides of the knob module 340. Particularly, the touch-control keys 510 may be capacitive touch-sensitive keys. The capacitive touch-sensitive keys achieve determination on the basis of a capacitance. In general, such a key is waterproof and has high anti-interference capability, so that external environments such as temperature and water will not affect its sensitivity, stability, and reliability. The key can be used for a long time, and is applicable to a low-temperature, wet working environment of a refrigerator.

In the embodiment of the present application, the knob module 340 and the touch-control keys 510 cooperate with each other for use to set and display states inside the independent drawers 140. The functions of the touch-control keys 510 may be startup & shutdown, function selection keys (temperature, dryness, humidity, etc.), and the like. Various operations of a user on the independent drawers 140 are read by the display screen 341 in the knob module 340, and are displayed on the display screen 341. The annular rotary table 342 may be configured to adjust a level of a mode selected by the user. For example, after the user selects temperature adjustment, the user spins the annular rotary table 342 to switch the level (quick cooling, quick freezing, purification, and the like).

Referring to FIG. 4 and FIG. 5, since connection between the base plate 210 and the operation panel 220 is achieved by detachable clamping between the bulge part 320 and the mounting slot 310, in order to limit the relative position between the base plate 210 and the operation panel 220, a fastener subassembly is required to locate them. The bulge part 320 has a cavity 410 inside, and the fastener subassembly is arranged inside the cavity. The fastener subassembly includes: a spring 420, a first positioning pillar 431, and a second positioning pillar 432. The spring 420 is arranged inside the cavity 410. The first positioning pillar 431 and the second positioning pillar 432 are arranged at two ends of the spring 420 and are respectively connected to the two ends of the spring 420. The mounting slot 310 is provided with a positioning hole 440 in a penetrating manner along a vertical direction. Ends of the first positioning pillar 431 and the second positioning pillar 432 away from the spring 420 can respectively pass through the cavity 410 and be fastened to the positioning hole 440, so as to locate the relative position between the base plate 210 and the operation panel 220.

The two ends of the spring 420 are connected with the first positioning pillar 431 and the second positioning pillar 432. During installation, when the two positioning pillars are pressed into the cavity 410 where the spring 420 is located, the bulge part 320 can extend deep into the mounting slot 310. When the relative position between the bulge part 320 and the mounting slot 310 is just appropriate, the first positioning pillar 431 and the second positioning pillar 432 pop out into the positioning hole 440 from the cavity 410, thus playing a role of limiting the relative position between the base plate 210 and the operation panel 220. In the embodiment of the present application, one cavity 410 is provided in the bulge part 320, and one fastener subassembly is provided inside the cavity. However, in practical application, a plurality of fastener subassemblies can be disposed according to factors such as a specific installation environment. The embodiments of the present application will not limit the number of the cavity 410 and the fastener subassembly arranged inside the cavity.

In order to improve the visual experience and aesthetic feeling of the user during the operation, in the embodiments of the present application, an operation surface 330 which is inclined towards the user may be formed. An included angle between the operation surface 330 and a horizontal direction is 20 degrees to 60 degrees. In some other embodiments, the operation surface 330 may alternatively be an ergonomic design such as an arc-shaped surface or a concave surface that is inclined towards the user, which aims to improve the visual experience and beauty of the operation surface. Particularly, in order to save the space inside the refrigerator 100, the base plate 210 in the embodiment of the present application may also be used as a top cover of the storage drawer 140 of the refrigerator 100, and this will not affect its function and effect.

A controller 600 of the refrigerator 100 of this embodiment is connected with the operation panel 220. As shown in FIG. 6, the controller 600 includes a memory 620 and a processor 610. The memory 620 stores a computer program 621. When executed by the processor 610, the computer program 621 is configured to implement a human-machine interaction method for a storage device inside a refrigerator in any of the following embodiments. Specifically, a printed circuit board 520 is further arranged inside the operation panel 220. The knob module 340 and the touch-control keys 510 are all electrically connected with the controller 600 through serial ports of the printed circuit board 520 to communicate with the controller 600 and participate in controlling the refrigerator 100.

Figure 7:
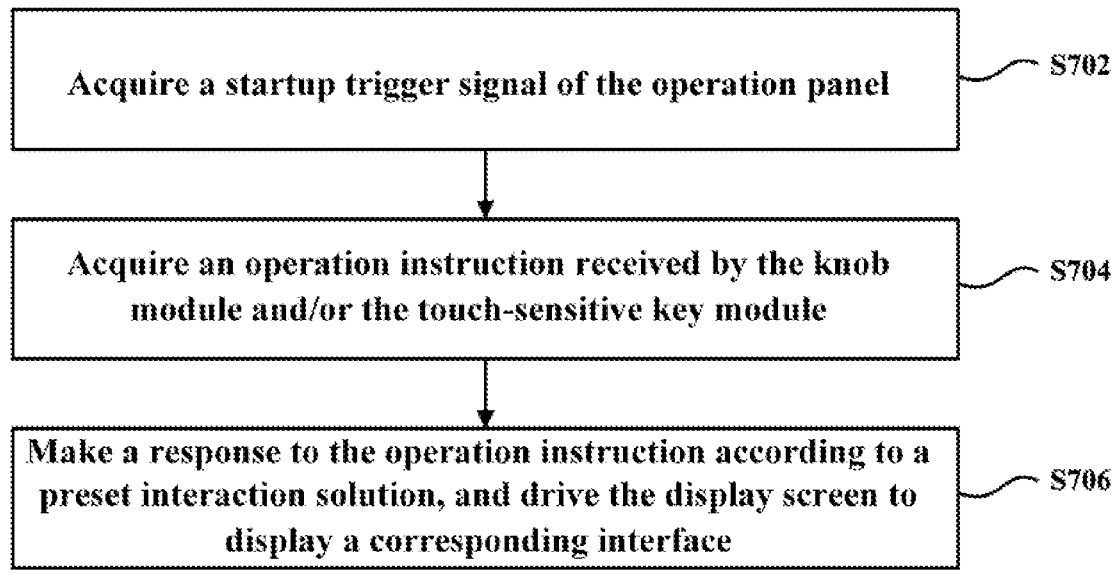
FIG. 7 is a schematic diagram of a human-machine interaction method for a storage device inside a refrigerator according to an embodiment of the present invention.

This embodiment further provides a human-machine interaction method for a storage device inside a refrigerator. The method for achieving interaction is very simple, which effectively improves the use experience of a user. FIG. 7 is a schematic diagram of a human-machine interaction method for a storage device inside a refrigerator according to an embodiment of the present invention. As shown in FIG. 7, the human-machine interaction method for a storage device inside a refrigerator may implement the following steps in sequence:

step S702, a startup trigger signal of the operation panel 220 is acquired;

step S704, an operation instruction received by the knob module 340 and/or the touch-sensitive key module is acquired; and step S706, a response to the operation instruction is made according to a preset interaction solution, and the display screen 341 is driven to display a corresponding interface.

In the above steps, in step S702, the startup trigger signal of the operation panel 220 is acquired. The startup trigger signal may be an opening signal of the door body 120 of the refrigerator 100. For example, when the door body 120 is opened, the operation panel 220 starts to work, and the knob module 340 and the touch-sensitive key module are ready to receive the operation instructions. In one specific embodiment, an ambient lamp may be provided on the knob module 340. When the door body 120 is opened, the ambient lamp is on, so that it is convenient for the user to carry out the operation.

The response set in the interaction solution in step S706 may include: switching display interfaces of multiple stages of menus and/or switching and selecting items in each stage of menu. The menu may include a first-stage menu, a second-stage menu, and a third-stage menu. Items set in the first-stage menu may include a temperature area function, such as a refrigeration area, a variable temperature area, and a dry and wet goods separate storage area, which can be achieved by the storage device. Items set in the second-stage menu may include a refrigeration function that can be provided by a selected temperature area. For example, the selected variable temperature area may provide the following functions: Treasure, Fresh Food, Babies&Kids, Icing. Items set in the third-stage menu may include running parameters of the selected refrigeration function, such as a specific temperature after Fresh Food is selected.

In step S704, the specific step of acquiring the operation instruction received by the knob module 340 may include: acquiring a rotation operation instruction corresponding to the rotation state of the annular rotary table and output by the annular rotary table 342, and the interaction solution includes: switching items in a current menu according to the rotation operation instruction. For example, in the first-stage menu, the refrigeration area, the variable temperature area, and the dry and wet goods separate storage area can be switched by spinning the annular rotary table 342. In the second-stage menu, the Treasure, Fresh Food, Babies&Kids, and Icing can be switched by spinning the annular rotary table 342. In the third-stage menu, the specific temperature can be switched by spinning the annular rotary table 342. The items of the current menu are displayed by the display screen 341. That is, if the display screen 341 displays characters or an identifier of the refrigeration area, it indicates switching to the refrigeration area. Furthermore, a back key can also be provided on the knob module 340. The back key is pressed to return to the previous menu.

Further, the specific step of acquiring the operation instruction received by the knob module 340 may further include: acquiring a touch-control operation instruction received by the display screen 341; and the interaction solution includes: selecting an item in a menu according to the touch-control operation instruction. For example, during switching to the dry and wet goods separate storage area by spinning the annular rotary table 342 in the first-stage menu, the storage device can be determined as the dry and wet goods separate storage area by pressing the display screen 341; during switching to Treasure by spinning the annular rotary table 342 in the second-stage menu, a stored food material can be determined as treasure by pressing the display screen 341; and during switching to a specific temperature of 5° C. by spinning the annular rotary table 342 in the third-stage menu, a storage temperature can be determined to be adjusted to 5° C. by pressing the display screen 341. In some other embodiments, when there is no operation within first preset time after the annular rotary table 342 is spun to switch the current item to a certain item, this item is selected by default; and it automatically returns to a main interface after second preset time.

In step S704, the specific step of acquiring the operation instruction received by the touch-sensitive key module may include: acquiring touch instructions received by the plurality of touch-control keys 510; and in the interaction solution, a corresponding response action is pre-configured for the touch instruction of each touch-control key 510. For example, there may be four touch-control keys 510, which may respectively correspond to the following functions: memo, purification, function, and temperature area. When the touch-control key 510 corresponding to the temperature area is pressed, it can be switched among the refrigeration area, the variable temperature area, and the dry and wet goods separate storage area. For another example, the touch-control keys 510 may respectively correspond to the following functions: voice, message center, additional function, and temperature. When the touch-control key 510 corresponding to the temperature is pressed, it can be switched to a specific storage temperature.

Figure 8:
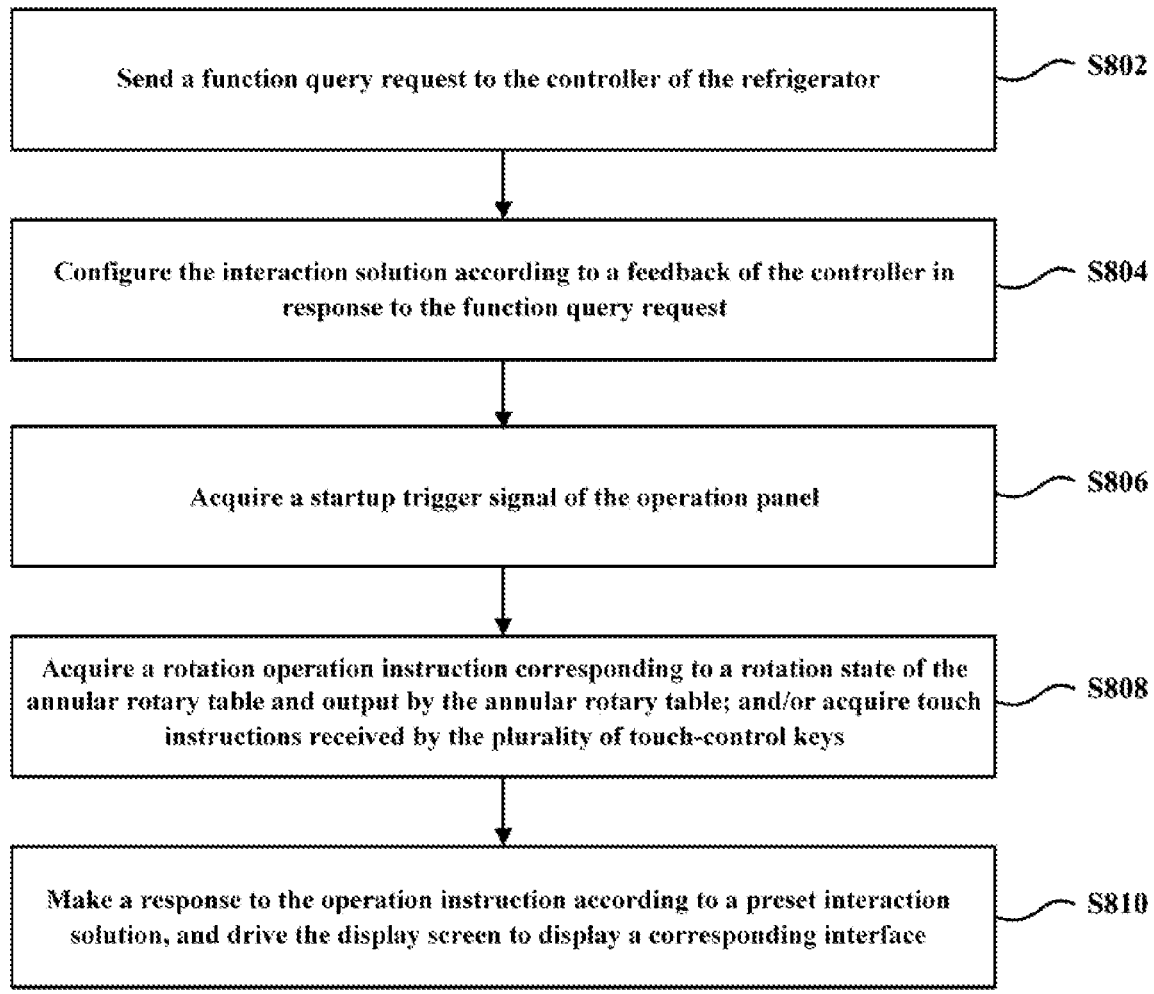
FIG. 8 is a detailed flow diagram of a human-machine interaction method for a storage device inside a refrigerator according to an embodiment of the present invention.

In some optional embodiments, the steps above may be further optimized and configured to achieve better technical effects of the refrigerator 100. The human-machine interaction method for a storage device inside a refrigerator of the present embodiment is described in detail with reference to the description of an optional execution flow of the present embodiment. The embodiment is merely illustration of the execution flow. In specific implementation, the execution sequence and running conditions of some steps can be modified according to specific implementation requirements. FIG. 8 is a detailed flow diagram of a human-machine interaction method for a storage device inside a refrigerator according to an embodiment of the present invention. The human-machine interaction method includes the following steps:

step S802, a function query request is sent to the controller 600 of the refrigerator 100;

step S804, the interaction solution is configured according to a feedback of the controller 600 in response to the function query request;

step S806, a startup trigger signal of the operation panel 220 is acquired;

step S808, a rotation operation instruction corresponding to a rotation state of the annular rotary table and output by the annular rotary table 342 is acquired; and/or touch instructions received by the plurality of touch-control keys 510 are acquired; and step S810, a response to the operation instruction is made according to a preset interaction solution, and the display screen 341 is driven to display a corresponding interface.

In the above steps, in step S804, the interaction solution is configured according to the feedback of the controller 600 in response to the function query request. Specifically, the interaction solution can be configured according to the refrigeration capability of the refrigerator 100. For example, if the refrigeration capability of the refrigerator 100 is higher, the specific storage temperature set in the third-stage menu may be lower; and if the refrigeration capability of the refrigerator 100 is lower, the specific storage temperature set in the third-stage menu may be higher, that is, the specific temperature in the third-stage menu is a temperature that can be achieved by the refrigerator 100. In addition, the interaction solution can also be configured according to a current storage condition of a storage space. For example, if tropical fruits are stored in the current storage space, the temperature area function that can be achieved by the storage device in the first-stage menu does not include a freezing area; and if ice suckers are stored in the current storage space, the temperature area function that can be achieved by the storage device in the first-stage menu does not include the refrigeration area.

In step S808, the rotation operation instruction corresponding to the rotation state of the annular rotary table and output by the annular rotary table 342 is acquired, and at this time, the interaction solution includes: switching items in a current menu according to the rotation operation instruction. For example, in the first-stage menu, the refrigeration area, the variable temperature area, and the dry and wet goods separate storage area can be switched by spinning the annular rotary table 342. In the second-stage menu, the Treasure, Fresh Food, Babies&Kids, and Icing can be switched by spinning the annular rotary table 342. In the third-stage menu, the specific temperature can be switched by spinning the annular rotary table 342. The items of the current menu are displayed by the display screen 341. That is, if the display screen 341 displays characters or an identifier of the refrigeration area, it indicates switching to the refrigeration area. Furthermore, a back key can also be provided on the knob module 340. The back key is pressed to return to the previous menu.

In step S808, the touch instructions received by the plurality of touch-control keys 510 are acquired. At this time, in the interaction solution, the corresponding response action is pre-configured for the touch instruction of each touch-control key 510. For example, there may be four touch-control keys 510, which may respectively correspond to the following functions: memo, purification, function, and temperature area. When the touch-control key 510 corresponding to the temperature area is pressed, it can be switched among the refrigeration area, the variable temperature area, and the dry and wet goods separate storage area. For another example, the touch-control keys 510 may respectively correspond to the following functions: voice, message center, additional function, and temperature. When the touch-control key 510 corresponding to the temperature is pressed, it can be switched to a specific storage temperature.

Figure 9:
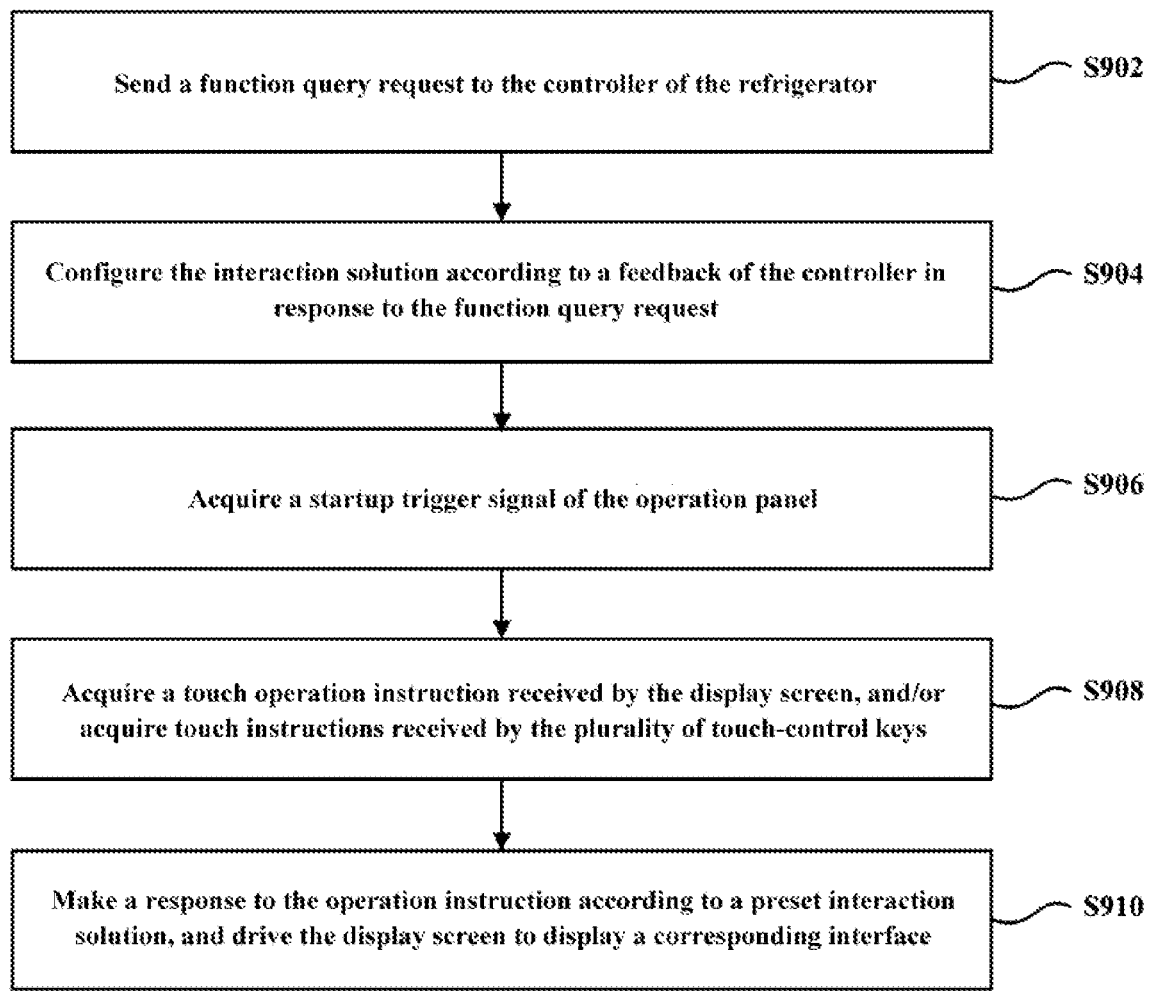
FIG. 9 is a detailed flow diagram of a human-machine interaction method for a storage device inside a refrigerator according to another embodiment of the present invention.

FIG. 9 is a detailed flow diagram of a human-machine interaction method for a storage device inside a refrigerator according to another embodiment of the present invention. The human-machine interaction method of this embodiment includes the following steps:

step S902, a function query request is sent to the controller 600 of the refrigerator 100;

step S904, the interaction solution is configured according to a feedback of the controller 600 in response to the function query request;

step S906, a startup trigger signal of the operation panel 220 is acquired;

step S908, a touch-control operation instruction received by the display screen 341 is acquired, and/or touch instructions received by the plurality of touch-control keys 510 are acquired; and step S910, a response to the operation instruction is made according to a preset interaction solution, and the display screen 341 is driven to display a corresponding interface.

In the above steps, in step S908, the touch-control operation instruction received by the display screen 341 is acquired, and at this time, the interaction solution includes: selecting an item in a menu according to the touch-control operation instruction. For example, the display screen 341 may display a plurality of items of each stage of menu for touch-control selection of a user. Specifically, in the first-stage menu, the display screen 341 may display a refrigeration area, a variable temperature area, and a dry and wet goods separate storage area; in the second-stage menu, the display screen 341 may display Treasure, Fresh Food, Babies&Kids, and Icing; and in the third-stage menu, the display screen 341 may display 0° C., 3° C., 6° C., and 9° C. The user can directly operate the display screen 341 to determine content selected on each stage of menu. For example, if the refrigeration area, icing, and 0° C. are respectively selected on each stage of menu, the storage device can be used as the refrigeration area to store the iced food material therein at 0° C.

The operation panel 220 in the above embodiments controls the storage device, that is, it enables the storage device to achieve the specific temperature area, refrigeration function, and running parameters. In some other embodiments, the operation panel 220 can also control the entire refrigerator 100. The menu may still include a first-stage menu, a second-stage menu, and a third-stage menu. A difference from the above embodiments lies in that the items set in the first-stage menu may include different temperature areas set in the refrigerator 100, such as the refrigeration area, the variable temperature area, and the dry and wet goods separate storage area. The temperature areas are switched by spinning the annular rotary table 342, and the specific temperature area to be adjusted can be determined by pressing the display screen 341. For example, when it is switched to the dry and wet goods separate storage area by spinning the annular rotary table 342, it can be determined to adjust the dry and wet goods separate storage area by pressing the display screen 341.

Compared with the prior art in the fields of intelligent house, intelligent home, intelligent household appliances, intelligent refrigerators, and the like, the human-machine interaction method for the storage device inside the refrigerator of this embodiment achieves that the user adjusts the functions of the refrigerator 100 through the knob module 340 and the touch-sensitive key module. The human-machine interaction mode is simple and convenient; and the intelligence level is increased.

Further, according to the human-machine interaction method for the storage device inside the refrigerator of this embodiment, spinning a button can set the refrigeration parameters of the storage device inside the refrigerator 100, and can also display its state, thus improving the richness of human-machine interaction.

Hereto, those skilled in the art should realize that although a plurality of exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and recognized as covering all these other variations or modifications.

What is claimed is:

1. A human-machine interaction method for a storage device inside a refrigerator, wherein the storage device is arranged in a storage compartment of the refrigerator, and the storage device is provided with an operation panel inside the refrigerator; an operation surface of the operation panel is provided with a knob module having a touch-control display screen arranged in a center of the knob module, and a touch-sensitive key module separate from the knob module; and the human-machine interaction method comprises:
  acquiring a startup trigger signal of the operation panel;
  acquiring an operation instruction received by the knob module and/or the touch-sensitive key module;
  making a response to the operation instruction according to a preset interaction solution, and driving the display screen to display a corresponding interface;
  wherein a response set in the interaction solution comprises switching display interfaces of multiple stages of menus or switching and selecting items in each stage of menu;
  wherein the menu comprises: a first-stage menu; and items set in the first-stage menu comprise a temperature area function that can be achieved by the storage device;
  wherein before acquiring a startup trigger signal of the operation panel, the human-machine interaction method further comprises:
  sending a function query request to a controller of the refrigerator; and
  configuring the interaction solution according to a feedback of the controller in response to the function query request.

2. The method according to claim 1, wherein the knob module further comprises: an annular rotary table, arranged at an outer circumferential side of the display screen and configured to be operated to rotate; and the step of acquiring an operation instruction received by the knob module comprises:
  acquiring a rotation operation instruction corresponding to a rotation state of the annular rotary table and output by the annular rotary table; and
  the interaction solution comprises: switching items in a current menu according to the rotation operation instruction.

3. The method according to claim 1, wherein the step of acquiring an operation instruction received by the knob module comprises:
  acquiring a touch-control operation instruction received by the display screen; and
  the interaction solution comprises: selecting an item in the menu according to the touch-control operation instruction.

4. The method according to claim 1, wherein the touch-sensitive key module comprises a plurality of touch-control keys; the step of acquiring an operation instruction received by the touch-sensitive key module comprises:
  acquiring touch instructions received by the plurality of touch-control keys; and
  in the interaction solution, a corresponding response action is pre-configured for the touch instruction of each touch-control key.

5. The method according to claim 1, wherein
the menu further comprises: a second-stage menu; and items set in the second-stage menu comprise a refrigeration function that can be provided by a selected temperature area.

6. The method according to claim 5, wherein
the menu further comprises: a third-stage menu; and items set in the third-stage menu comprise running parameters of the selected refrigeration function.

7. A refrigerator, comprising:
a cabinet, in which a storage compartment is defined;
a storage device, arranged in the storage compartment of the refrigerator, wherein the storage device is provided with an operation panel, and an operation surface of the operation panel is provided with a knob module having a display screen, and a touch-sensitive key module; and
a controller, connected with the operation panel and comprising a memory and a processor, wherein the memory stores a computer program, and when executed by the processor, the computer program is configured to implement the human-machine interaction method according to claim 1.

8. The method according to claim 1, wherein the step of configuring the interaction solution according to the feedback of the controller in response to the function query request comprises:
  configuring the interaction solution according to a refrigeration capability of the refrigerator.

9. The method according to claim 1, wherein the step of configuring the interaction solution according to the feedback of the controller in response to the function query request comprises:
  configuring the interaction solution according to a current storage condition of the storage device.

10. The method according to claim 1, wherein the operation surface of the operation panel is inclined towards a front opening of the storage compartment.

11. The method according to claim 1, wherein the storage device is a storage drawer arranged in the storage compartment.

* * * * *